(12) United States Patent
Asada

(10) Patent No.: US 6,924,873 B2
(45) Date of Patent: Aug. 2, 2005

(54) LIQUID CRYSTAL DISPLAY DEVICE AND ITS PRODUCTION METHOD

(75) Inventor: Tadahiro Asada, 34-1, Kitaohji-cho, Kamigamo, Kita-ku, Kyoto-shi, Kyoto 603-8071 (JP)

(73) Assignee: Tadahiro Asada, Kyoto (JP)

( * ) Notice: Subject to any disclaimer, the term of this patent is extended or adjusted under 35 U.S.C. 154(b) by 42 days.

(21) Appl. No.: 10/477,266

(22) PCT Filed: Apr. 19, 2002

(86) PCT No.: PCT/JP02/03964
§ 371 (c)(1),
(2), (4) Date: Dec. 8, 2003

(87) PCT Pub. No.: WO02/093241
PCT Pub. Date: Nov. 21, 2002

(65) Prior Publication Data
US 2004/0246431 A1 Dec. 9, 2004

(30) Foreign Application Priority Data
May 14, 2001 (JP) ........................ 2001-142894
May 21, 2001 (JP) ........................ 2001-151273

(51) Int. Cl.$^7$ .......................................... G02F 1/1333
(52) U.S. Cl. .................... 349/172; 349/86; 349/165; 349/172; 349/175; 349/185
(58) Field of Search ................... 349/172, 86, 165, 349/175, 185

(56) References Cited

U.S. PATENT DOCUMENTS 5,574,593 A * 11/1996 Wakita et al. ............... 359/259
6,203,723 B1 * 3/2001 Hsu ......................... 252/299.01

FOREIGN PATENT DOCUMENTS

| JP | A 05-88150 | 4/1993 |
| JP | A 06-194633 | 7/1994 |
| JP | A 09-318977 | 12/1997 |
| JP | B2 3030973 | 2/2000 |

OTHER PUBLICATIONS

T. Asada et al., "Spatial Light modulator by Using Polymer Cell–Wall Type Liquid Crystal Optical Shutter", Mol. Cryst. Liq. Cryst., 1996 vol. 282, pp. 355–363.

* cited by examiner

Primary Examiner—Robert H. Kim
Assistant Examiner—(Nancy) Thanh-Nhan P Nguyen
(74) Attorney, Agent, or Firm—Oliff & Berridge, PLC

(57) ABSTRACT

The objective of the present invention is to provide a liquid crystal display device for displaying colors by transmission and reflection modes and a method for producing such devices, whereby the additive color mixing can be used, the structure is simplified, the driving-voltage is lower, the contrast is higher, the response speed is higher, and the screen can be larger. This objective can be achieved by a method including the following steps: mixing 0.001 to 20 wt % of dichromatic melanotic pigment into chiral nematic liquid crystal mixed with chiral dopant; preparing a mixture of the liquid crystal and prepolymer to be polymerized into transparent polymeric solid; inserting the mixture into the space between two conductive substrates, wherein at least one of which is transparent; and irradiating ultra-violet light or neighboring short-wavelength light onto the mixture. This process creates an accumulation of small packets composed of the liquid crystal packed with a thin film of the transparent polymeric solid within a light-controlling layer between the two conductive substrates. When no voltage is applied, the pigment molecules absorb light because they are distributed within the space with their longitudinal axis randomly directed. When a voltage is applied, elongated liquid crystal molecules are oriented perpendicular to the substrates, and the pigment molecules are also oriented in a similar manner. In this state, the black color of the pigment molecules does not appear, so that light is allowed to pass therethrough.

8 Claims, 3 Drawing Sheets

SMALL PACKET

DOMAIN
--- LIQUID CRYSTAL MOLECULE
— PIGMENT MOLECULE
⋮ AXIS OF SPIRAL

Fig. 3A
Fig. 3B
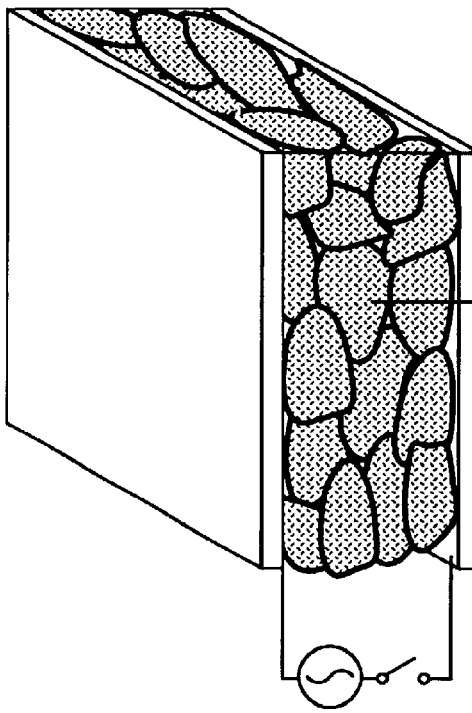
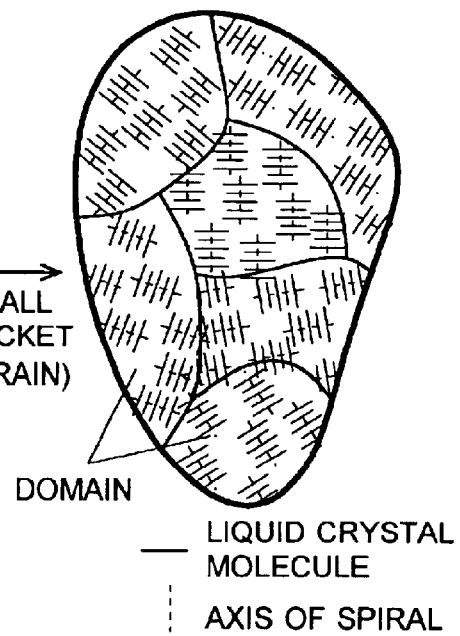
SMALL PACKET (GRAIN)
DOMAIN
— LIQUID CRYSTAL MOLECULE
⋮ AXIS OF SPIRAL
Fig. 4A
Fig. 4B
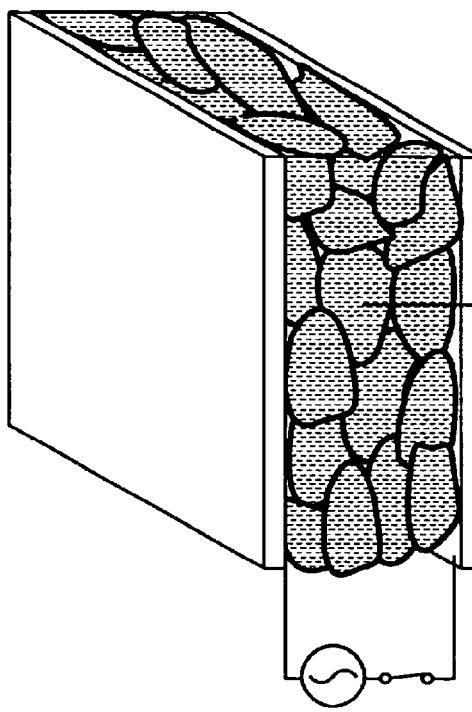
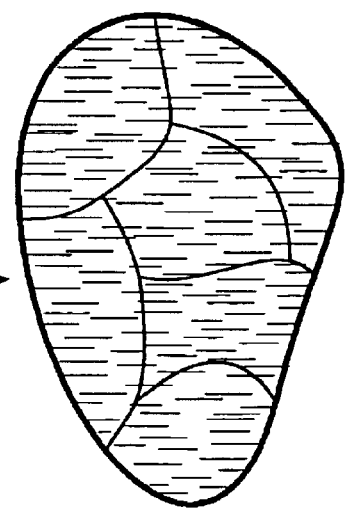

LIQUID CRYSTAL DISPLAY DEVICE AND ITS PRODUCTION METHOD

TECHNICAL FIELD

The present invention relates to a transmission type liquid crystal display device as an improvement of a transmission-scattering type liquid crystal optical shutter, and also relates to a method for producing such devices.

BACKGROUND ART

Conventional liquid crystal display devices include the TN (Twisted Nematic) type and the STN (Super Twisted Nematic) type, both using nematic liquid crystal. These types require polarizers, which causes a problem in that the brightness of the display becomes less. Furthermore, since the thickness of the cell must be accurately controlled, it is difficult to enlarge the screen, and the view angle is narrow.

To solve these problems and provide a low-cost liquid crystal display device with a large, bright screen having a high contrast ratio, research has been conducted on the application of polymer dispersed types or polymer+liquid crystal composite systems to liquid crystal devices. Most of the display devices developed to date that use polymer dispersed types or polymer+liquid crystal composite systems employ nematic liquid crystal as the liquid crystal component. The response speeds of these display devices are considerably low compared to other liquid crystal display devices, while a voltage for driving them is relatively higher.

Regarding another matter, research has also been conducted on polymer+liquid crystal composite systems using cholesteric liquid crystal as the liquid crystal component. Above all others, the PCW (Polymer Cell Wall) type liquid crystal optical shutter, which is disclosed in the Japanese Patent No. 3030973 (Tadahiro Asada), has exhibited considerable improvement in respect to the contrast ratio and the response speed. This type is now at the level of practical application.

In scattering types, however, it is necessary to use subtractive color mixing to display colors. This means that a laminated cell structure or similar structure is required. Also, while the display becomes brighter, there is a problem in that its producing consumes time and labor.

The present invention provides improvements in the aforementioned aspects, and its objective is to provide a liquid crystal display device for displaying colors by transmission and reflection modes and a method for producing such devices, whereby the additive color mixing can be used, the structure is simplified, the driving-voltage is lower, the contrast is higher, the response speed is higher, and the screen can be larger.

In general, devices currently called "reflection type" are constructed so that a reflector is located at the back of the device to reflect light, the reflected light is guided to pass through color filters corresponding to three primary colors, and the three primary colors are blended to display colors. The principle used in this type is the same as that used in the transmission type; the only difference is that one type uses direct light from the light source whereas the other type uses reflected light. Accordingly, in this specification, it is assumed that the term "transmission type" includes the reflection type.

DISCLOSURE OF THE INVENTION

To solve the aforementioned problems, the inventor has conducted intensive research on a liquid crystal optical shutter having a light-controlling layer structured by an accumulation of small packets, wherein each packet is composed of chiral nematic liquid crystal containing chiral dopant (or, inherently, cholesteric liquid crystal) into which dichromatic melanotic pigment is mixed, and the liquid crystal is packed with a thin film of transparent polymeric solid. As a result, it has been found that setting the concentration of the dichromatic melanotic pigment within a specific range will make it possible to drive the shutter by a low voltage with a high response speed and use it to display colors by additive color mixing.

On the basis of the above cognition, the liquid crystal display device according to the first aspect of the present invention includes two conductive substrates, wherein at least one of which is transparent, and a light-controlling layer inserted between the two substrates, wherein:

a) the light-controlling layer is composed of an accumulation of small packets each composed of chiral nematic liquid crystal packed with a thin film made of transparent polymeric solid;

b) the chiral nematic liquid crystal contains:

b1) 0.05 to 5% of chiral dopant by weight of the liquid crystal; and b2) 0.001 to 20% of dichromatic melanotic pigment by weight of the liquid crystal, and c) the chiral dopant is a mixture of c1) cholesteric liquid crystal; and c2) ferroelectric liquid crystal showing the chiral smectic C phase.

The method for producing a liquid crystal display device according to the first aspect of the present invention is characterized by the following steps:

a) chiral dopant is prepared by mixing cholesteric liquid crystal and ferroelectric liquid crystal showing the chiral smectic C phase;

b) 0.05 to 5 wt % of the chiral dopant and 0.001 to 20 wt % of dichromatic melanotic pigment are mixed into nematic liquid crystal;

c) a mixture of 1 to 50 wt % of prepolymer to be polymerized into transparent polymeric solid and the chiral nematic liquid crystal is inserted into the space between two conductive substrates, wherein at least one of which is transparent; and d) ultra-violet light or neighboring short-wavelength light is irradiated onto the mixture to form an accumulation of small packets each composed of the liquid crystal packed with a thin film of the transparent polymeric solid.

Based on the aforementioned cognition, the inventor has also conducted intensive research on new structures for the device and found that a high-performance device can be obtained by separately providing two types of light-controlling layers, i.e. a pigment-bearing layer and a light-scattering layer, between two electrode substrates (conductive substrates).

Thus, the liquid crystal display device according to the second aspect of the present invention includes:

a) two external electrode substrates, wherein at least one of which is transparent; and b) light-controlling layers including a pigment-bearing layer and a light-scattering layer inserted between the two substrates, wherein:

c) the pigment-bearing layer is composed of nematic liquid crystal, chiral nematic liquid crystal or cholesteric liquid crystal into which dichromatic melanotic pigment is mixed; and d) the light-scattering layer is composed of an accumulation of small packets each composed of chiral nematic liquid crystal packed with a thin film of transparent polymeric solid, the chiral nematic liquid crystal contains 0.05 to 5 wt % of chiral dopant, and the chiral dopant is a mixture of cholesteric liquid crystal and ferroelectric liquid crystal showing the chiral smectic C phase.

The liquid crystal display device according to the second aspect of the invention may be provided with an intermediate electrode substrate between the two light-controlling layers (i.e. between the two external electrode substrates). In this case, the liquid crystal display device includes:

a) two external electrode substrates, wherein at least one of which is transparent;

b) an intermediate electrode substrate inserted between the two substrates with a gap from each of the two substrates; and c) light-controlling layers including a pigment-bearing layer and a light-scattering layer between the two substrates, wherein:

d) the pigment-bearing layer is composed of nematic liquid crystal, chiral nematic liquid crystal or cholesteric liquid crystal into which dichromatic melanotic pigment is mixed; and e) the light-scattering layer is composed of an accumulation of small packets each composed of chiral nematic liquid crystal packed with a thin film of transparent polymeric solid, the chiral nematic liquid crystal contains 0.05 to 5 wt % chiral dopant, and the chiral dopant is the mixture of cholesteric liquid crystal and ferroelectric liquid crystal showing the chiral smectic C phase.

The method for producing a liquid crystal display device according to the second aspect of the present invention is characterized by the following steps:

a) chiral dopant is prepared by mixing cholesteric liquid crystal and ferroelectric liquid crystal showing the chiral smectic C phase;

b) chiral nematic liquid crystal is prepared by mixing 0.05 to 5 wt % of the chiral dopant into nematic liquid crystal;

c) a mixture of 1 to 50 wt % of prepolymer to be polymerized into transparent polymeric solid and the chiral nematic liquid crystal is deposited onto an external electrode substrate, followed by ultra-violet light or neighboring short-wavelength light which is irradiated onto the mixture to form an accumulation of small packets each composed of the liquid crystal packed with a thin film of the transparent polymeric solid; and d) a pigment-bearing layer is formed on the light-scattering layer, where the pigment-bearing layer is composed of nematic liquid crystal, chiral nematic liquid crystal or cholesteric liquid crystal into which dichromatic melanotic pigment is mixed.

[Embodiment of the First Aspect of the Invention]

The basic construction of the light-controlling layer according to the first aspect of the present invention is as described in the Japanese Patent No. 3,030,973, especially in paragraphs [0009]–[0020]. That is to say, there are a large number of small packets each composed of chiral nematic liquid crystal packed with a thin film of transparent polymeric solid, and the inside of each packet is divided into many regions called "domains" (i.e. polydomain structure). In chiral nematic liquid crystal, the liquid crystal molecules are oriented so that their directions spirally turn. As shown in FIGS. 1A and 1B, the axes of the spirals are oriented in the same direction within each domain. In the first aspect of the present invention, 0.001 to 20 wt % of dichromatic melanotic pigment is mixed into the chiral nematic liquid crystal contained in the packet.

The dichromatic melanotic pigment diffused within the liquid crystal of the light-controlling layer consists of elongated, bar-shaped molecules whose chemical structure is similar to that of the nematic liquid crystal molecules. Therefore, when mixed into liquid crystal, these molecules follow the directional activities of the liquid crystal. Accordingly, when no voltage is applied, the molecules are distributed within the space inside of each domain with their longitudinal axes randomly oriented, as shown in FIGS. 1A and 1B. In this state, the molecules absorb light, not allowing it to pass through. When a voltage is applied across the light-controlling layer, the elongated molecules of the liquid crystal are oriented perpendicular to the substrates (i.e. homeotropic alignment). Since the pigment molecules are also oriented in a similar manner, the black color of the molecules does not appear. Thus, it is possible to display colors by additive color mixing in the transmission mode without using polarizers.

The composition of the liquid crystal and the concentration of the polymer may be as described in the Japanese Patent No. 3,030,973. Alternatively, it is possible to use the values that have yielded a positive result for PCW liquid crystal optical shutters (see, for example, T. Asada, Mol. Crys. Liq. Crys., Vol. 282 (1996), pp. 355–363). Mixing a small amount of melanotic pigment scarcely affects the optimal values of the composition.

The concentration of the pigment, on the other hand, significantly affects the characteristics of the optical shutter. An excessively high concentration will lower the response speed, increase the driving voltage and increase the contrast ratio. Lower concentrations will improve the response speed and decrease the driving voltage. This, however, will lower the light-blocking capability and the contrast ratio. Therefore, it is necessary to select the best substance and the best concentration that will not make the response speed lower and the driving voltage higher, while at the same time providing a high contrast ratio.

The inventor has found that setting the concentration of the dichromatic melanotic pigment contained in the liquid crystal component of the light-controlling layer within the range of 0.001 to 20 wt %, preferably 0.1 to 15 wt %, will provide a high-performance liquid crystal optical shutter capable of being driven by a relatively low driving voltage of 3 to 15V, with the rising time ($\tau_r$) 2 to 10 ms, the descending time ($\tau_d$) 6 to 15 ms and the maximum contrast ratio ($T_{100}/T_0$) about 300:1 or higher, where $T_{100}$ is the maximum transmissivity (%) when a voltage is applied, and $T_0$ is the minimum transmissivity, i.e. the transmissivity (%) when a voltage is not applied.

In the device according to the first aspect of the present invention, the substrate may be of any type as long as it is transparent and has a conductive layer. For example, glass plates, transparent resin sheets and films are available.

For the dichromatic melanotic pigment used in the light-controlling layer, a mixture of dichromatic pigments (e.g. anthraquinone group, azo group) corresponding to three colors (cyan, magenta and yellow) is suitable, if the pigments adequately dissolve into the major liquid crystal component (i.e. the nematic liquid crystal), the mixture contains only a few to several kinds of molecules, and the molecules are similarly oriented with the configuration of the nematic liquid crystal molecules. Furthermore, it is desirable that it has a high specific resistance. Examples of available substances include Black-1, Black-2, Black-3, Black-4, Black-5 and Black-6 (all produced by Mitsubishi Chemical Corporation) and so on. Above all, Black-4, Black-5, Black-6 are suitable because they exhibit high absorbance over the entire wavelength range.

The materials to be used as the liquid crystal component (nematic liquid crystalline, cholesteric liquid crystalline, and chiral smectic C liquid crystalline) of the light-controlling layer should satisfy the following requirements: they should have adequate responsiveness to an electric field at a normal temperature; they should have good solubility to each other; they should allow dichromatic melanotic pigments to dissolve into them when mixed; the pigment-bearing liquid crystal component should be adequately mixed with prepolymer component (polymer component); when prepolymer component is solidified by photo-polymerization, the pigment-bearing liquid crystal phase should simultaneously precipitate in the form of grains with the solidification, and the phase should be packed with a thin film of a polymeric solid that is simultaneously formed. As long as these conditions are met, any of the generally known nematic liquid crystalline, cholesteric liquid crystalline and chiral smectic C phase liquid crystalline substances can be used. Examples include biphenyl type, phenylcyclohexane type, cyclohexane type, cyanohexylcyclohexane type and mixtures of these types. Especially, cyanobiphenyl type, cyanophenylcyclohexane type and cyanohexylcyclohexane type are preferable because they exhibit high responsiveness to an electric field.

The types and the concentrations of the cholesteric liquid crystal and the liquid crystal showing the chiral smectic C phase used as the chiral dopant in the liquid crystal component may be determined according to the Japanese Patent No. 3,030,973.

In order to obtain adequate wall effect, the polymer that coexists with the pigment-bearing liquid crystal component should be structured so that the pigment-bearing liquid crystal grains are individually packed with a thin film of the polymer solid. Preferably, the polymer component is formed by mixing prepolymer or monomer with the pigment-bearing liquid crystal component and then polymerizing and solidifying them at a normal temperature by irradiating light (ultra-violet light or neighboring short-wavelength light) or by some other methods. In this process, the polymerization proceeds while maintaining the focalconic texture of the cholesteric liquid crystal within the grain. The result is that the grain having a polydomain structure is packed with a thin film of the polymer. Examples of such photo-curing prepolymer that solidifies under ultra-violet light or neighboring short-wavelength light are acrylic type, meta-acrylic type, etc. The percentage of the polymer component in the light-controlling layer should be 1 to 50 wt %, preferably 8 to 20 wt %. When the percentage of the polymer component is high, the thin film grows thicker, which reduces the effective wall area per unit weight and accordingly decreases the light-controlling capability.

Optional components may be mixed according to the properties of the pigment-bearing liquid crystal component and/or the polymer component, or according to the type, use, etc., of the display device of interest. Such optional components include polymerization-initiators, such as benzophenone, 1-hydroxycyclohexylphenylketone, and so on, chain transfer agents, and other pigments.

An example of the method for producing the liquid crystal optical shutter according to the first aspect of the present invention is as follows. Chiral dopant is added to and mixed with nematic liquid crystal component in the state of isotropy. Then, dichromatic melanotic pigment component is added to and mixed with it. Subsequently, prepolymer and optional components are added and stirred for mixing. The mixture is inserted into the space between two transparent conductive substrates, the gap of which is defined by a spacer at a predetermined value. Then, ultra-violet light or similar light is irradiated through the substrate onto the mixture, whereby the polymer component of the prepolymer is solidified into a thin film containing liquid crystal grains. Thus, an opaque light-controlling layer is formed.

In the first aspect of the present invention, the thickness of the light-controlling layer is not limited to specific values. However, in respect of responsiveness, it should be preferably 3 to 80 $\mu$m. For direct vision display devices, it should be preferably 3 to 20 $\mu$m.

According to the first aspect of the present invention, a high-performance liquid crystal optical shutter capable of displaying colors by transmission mode is obtained, which can be driven by a voltage of 3 to 15V, with the rising time ($\tau_r$) 2 to 10 ms, the descending time ($\tau_d$) 6 to 15 ms and the maximum contrast ratio ($T_{100}/T_0$) 300:1 or higher. Compared to conventional liquid crystal optical shutters of polymer+liquid crystal composite types, which require a driving voltage of several tens of volts, the aforementioned voltage is considerably low. Moreover, despite the low driving voltage, the response speed is as high as those of conventional ones. Thus, according to the first aspect of the present invention, it is possible to provide a practical, high-performance transmission type color display device.

[Embodiment of the Second Aspect of the Invention]

In the device according to the second aspect of the present invention, the basic structure of the light-scattering layer is the same as that of the light-controlling layer according to the first aspect described previously. That is, there are a large number of small packets each composed of chiral nematic liquid crystal packed with a thin film of transparent polymeric solid, and the liquid crystal contained in each packet presents the polydomain structure. In chiral nematic liquid crystal, the liquid crystal molecules are oriented so that their directions spirally turn, and the axes of the spirals are oriented in the same direction within each domain. When no voltage is applied, the axes of the spiral are randomly oriented, differing from domain to domain, as shown in FIGS. 3A and 3B. In this state, the molecules scatter light, not allowing it to pass through. When a voltage is applied across the light-scattering layer, the liquid crystal molecules are oriented along the direction of an electric field, i.e. perpendicular to the substrate (homeotropic alignment). In this state, the light passes through without being scattered.

The pigment-bearing layer is prepared by mixing dichromatic melanotic pigment into nematic liquid crystal, chiral nematic liquid crystal or cholesteric liquid crystal. The dichromatic melanotic pigment consists of elongated, bar-shaped molecules whose chemical structure is similar to that of the nematic liquid crystal molecules. Therefore, when mixed into liquid crystal, these molecules follow the motions of the liquid crystal. Accordingly, when no voltage is applied between the electrode substrates across the liquid crystal layer, the liquid crystal molecules and the pigment molecules are randomly oriented. In this state, the pigment molecules absorb light, not allowing it to pass through. When a voltage is applied between the electrode substrates, the pigment molecules are oriented along the direction of an electric field, i.e. perpendicular to the electrode substrates. In this state, the light is allowed to pass through the pigment-bearing layer.

In the liquid crystal display device according to the present invention, both the pigment-bearing layer and the light-scattering layer allow light to pass through them when a voltage is applied, while they block light by scattering or absorbing it when no voltage is applied. This makes it possible to realize a liquid crystal display device without using polarizers. Furthermore, combining color filters with the device makes it possible to display colors by additive color mixing in the transmission mode.

As for the light-scattering layer, the composition of the liquid crystal and the concentration of the polymer may be as described in the Japanese Patent No. 3,030,973. Alternatively, it is possible to use the values that have yielded a positive result for PCW liquid crystal optical shutters (see T. Asada (1996), op. cit.).

The materials to be used as the liquid crystal component (nematic liquid crystalline, cholesteric liquid crystalline, chiral smectic C liquid crystalline) of the light-scattering layer should satisfy the following requirements: they should have adequate responsiveness to an electric field at a normal temperature; they should have good solubility to each other; they should be adequately mixed with prepolymer component (polymer component); when prepolymer component is solidified by photo-polymerization, the liquid crystal phase should simultaneously precipitate in the form of grains (or packets) with the solidification, and the phase should be packed with a thin film of a polymeric solid that is simultaneously formed. As long as these conditions are met, any of the generally known nematic liquid crystalline, cholesteric liquid crystalline and chiral smectic C phase liquid crystalline substances can be used. Examples include biphenyl type, phenylcyclohexane type, cyclohexane type, cyanohexylcyclohexane type and mixtures of these types. Especially, cyanobiphenyl type, cyanophenylcyclohexane type and cyanohexylcyclohexane type are preferable because they exhibit high responsiveness to an electric field.

The types and the concentrations of the cholesteric liquid crystal and the liquid crystal showing the chiral smectic C phase used as the chiral dopant in the liquid crystal component may be determined according to the Japanese Patent No. 3,030,973.

In order to obtain adequate wall effect, the polymer that coexists with the liquid crystal component should be structured so that the liquid crystal grains are individually packed with a thin film of the polymer. Preferably, the polymer component is formed by mixing prepolymer or monomer with the liquid crystal component and then polymerizing and solidifying them at a normal temperature by irradiating light (ultra-violet light or neighboring short-wavelength light) or by some other methods. In this process, the polymerization proceeds while maintaining the focalconic texture of the cholesteric liquid crystal within the grain. The result is that the grain having a polydomain structure is packed with a thin film of the polymer. Examples of such photo-curing prepolymer that solidifies under ultra-violet light or neighboring short-wavelength light are acrylic type, meta-acrylic type, etc.

The percentage of the polymer component in the light-scattering layer should be 1 to 50 wt %, preferably 8 to 20 wt %. When the percentage of the polymer component is high, the film grows thicker, which reduces the effective wall area per unit weight and accordingly decreases the light-controlling capability.

Optional components may be mixed according to the properties of the pigment-bearing liquid crystal component and/or the polymer component, or according to the type, use, etc., of the display device of interest. Such optional components include polymerization-initiators, such as benzophenone, 1-hydroxycyclohexylphenylketone, and so on, chain transfer agents, and other pigments.

For the dichromatic melanotic pigment used in the pigment-bearing layer, a mixture of dichromatic pigments (e.g. anthraquinone group, azo group) corresponding to three colors (cyan, magenta and yellow) is suitable, if the pigments adequately dissolve into the major liquid crystal component (i.e. the nematic liquid crystal, the chiral nematic liquid crystal or the cholesteric liquid crystal), the mixture contains only a few to several kinds of molecules, and the molecules are similarly oriented with the configuration of the liquid crystal molecules. Furthermore, it is desirable that it has a high specific resistance. Examples of available substances include Black-1, Black-2, Black-3, Black-4, Black-5, Black-6 (all produced by Mitsubishi Chemical Corporation) and so on. Above all, Black-4, Black-5 and Black-6 are suitable because they exhibit high absorbance over the entire wavelength range.

Also in the device according to the second aspect of the present invention, the concentration of the pigment significantly affects the characteristics of the optical shutter. Therefore, it is necessary to select the best substance and the best concentration that will not make the response speed lower and the driving voltage higher, while at the same time providing a high contrast ratio.

The inventor has found that by setting the concentration of the dichromatic melanotic pigment contained in the liquid crystal component of the pigment-bearing layer within the range of 0.001 to 20 wt %, preferably 0.1 to 15 wt %, this will provide a high-performance liquid crystal optical shutter capable of being driven by a relatively low driving voltage of 0.5 to 4V, with the rising time 1 to 5 ms, the descending time 2 to 8 ms and the maximum contrast ratio ($T_{100}/T_0$) 300:1 or higher.

In the device according to the second aspect of the present invention, the substrate may be of any type as long as it is transparent and has a conductive layer. For example, glass plates, transparent resin sheets and films are available.

An example of the method for producing the liquid crystal optical shutter according to the second aspect of the present invention is as follows. Three pieces of transparent conductive substrates are positioned with predetermined gaps defined by spacers. The top and bottom substrates are the external electrode substrates, the internal faces of which are conductive (i.e. electrodes). The middle substrate is the intermediate electrode substrate, both faces of which are conductive (i.e. electrodes). Next, a light-scattering layer is prepared. That is to say, chiral dopant is added to nematic liquid crystal component in the state of isotropy and mixed with it. Subsequently, prepolymer and optional components are added, stirred and mixed with it. The mixture is inserted into the space between one of the external electrode substrates and the intermediate electrode substrate. Then, ultra-violet light or similar light is irradiated through the substrate onto the mixture, whereby the polymer component of the prepolymer is solidified into a thin film containing liquid crystal grains. Thus, an opaque light-scattering layer is formed. After that, a pigment-bearing layer is prepared. In fact, dichromatic melanotic pigment is added to and mixed with nematic liquid crystal, chiral nematic liquid crystal or cholesteric liquid crystal. The pigment-bearing layer component thus obtained is inserted into the space between intermediate electrode structure and the other external electrode substrate. Finally, the electrode substrates are connected to a predetermined liquid crystal driver. Thus, a liquid crystal optical shutter is obtained.

An optical shutter without the intermediate electrode substrate can be produced as follows. Onto a transparent conductive substrate (as an external electrode substrate), the aforementioned light-scattering layer component is deposited by spin coat or other methods. Then, ultra-violet light or similar light is irradiated onto the mixture, whereby the polymer component is solidified into a thin film containing liquid crystal grains. Thus, an opaque light-scattering layer is formed. Finally, the other external electrode substrate is positioned over the layer with a spacer or similar device, and the aforementioned pigment-bearing layer component is inserted in the space between the solidified light-scattering layer and the other external electrode substrate.

In the second aspect of the present invention, the thickness ($I_A$) of the light-scattering layer and the thickness ($I_B$) of the pigment-bearing layer are not limited to specific values.

However, in respect of responsiveness, the value $$L = I_A + I_B$$

should preferably be 3 to 82 μm. For direct vision display devices, it should be preferably 3 to 30μm. $I_A$ and $I_B$ should be preferably 2 to 80 μm and 1 to 30 μm, respectively.

According to the second aspect of the present invention, a high-performance liquid crystal optical shutter capable of displaying colors by transmission mode is obtained, which can be driven by a voltage of 2 to 15V, with the rising time ($\tau_r$) 2 to 10 ms, the descending time ($\tau_d$) 3 to 16 ms and the maximum contrast ratio ($T_{100}/T_0$) 450:1 or higher. Compared to conventional liquid crystal optical shutters of polymer dispersed type and polymer+liquid crystal composite type, which require a driving voltage of several tens of volts, the aforementioned voltage is considerably low. Moreover, despite the low driving voltage, the response speed is as high as that of conventional ones. Thus, it is possible to provide a practical, high-performance transmission type color display device.

BRIEF DESCRIPTION OF THE DRAWINGS

FIGS. 3A and 3B are illustrations showing the light-scattering layer according to the second aspect of the present invention in the state where no voltage is applied.

FIGS. 4A and 4B are illustrations showing the light-scattering layer of FIGS. 3A and 3B in the state where no voltage is applied.

BEST MODE FOR CARRYING OUT THE INVENTION

Figure 1A:
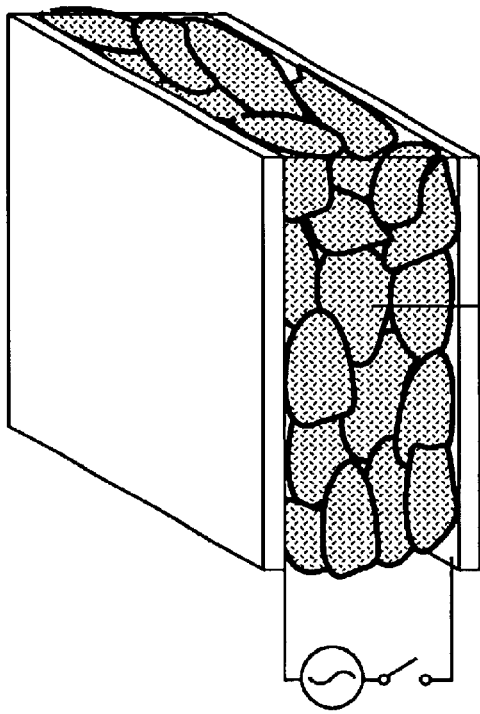
FIGS. 1A and 1B are illustrations showing a liquid crystal device as an example of the first aspect of the present invention in the state where no voltage is applied.
Figure 1B:
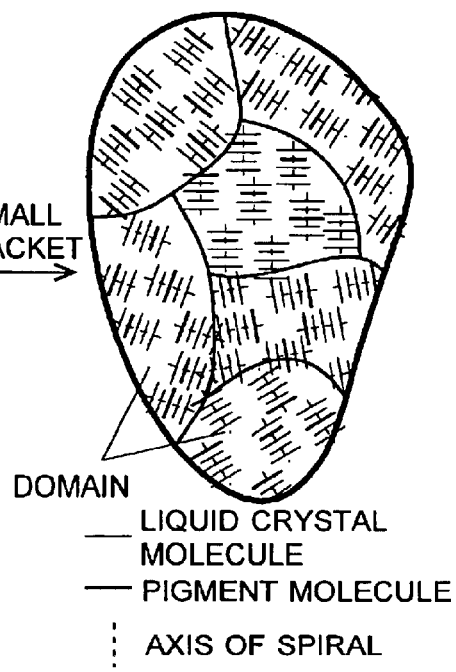
Figure 2A:
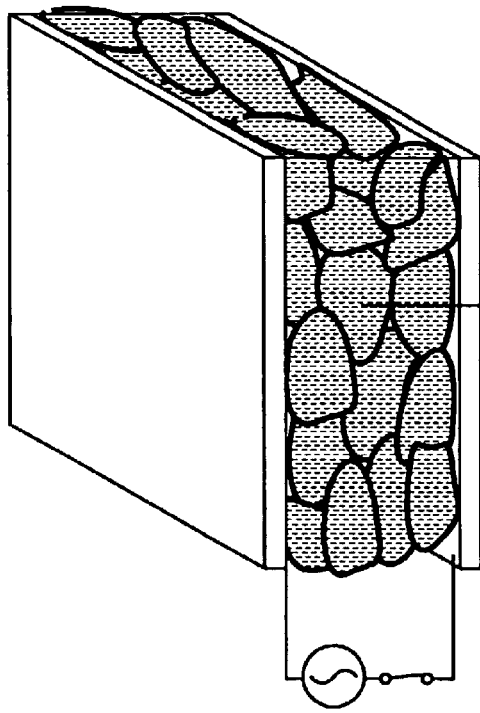
FIGS. 2A and 2B are illustrations showing the liquid crystal device of FIGS. 1A and 1B in the state where a voltage is applied.
Figure 2B:
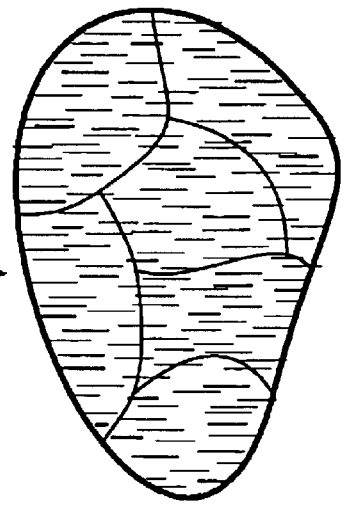

Examples of the present invention are described in detail below. It should be noted that the present invention is not limited to these examples. The electro-optical characteristics of the devices produced in the examples were measured with a function generator "1920A" (produced by NF Corporation) as the power supply and a 150 W (100V) halogen lamp as the light source. Samples were set at a distance of 10 cm from the lamp house including the halogen lamp and the white light filter for a microscope (furthermore, color filters for red, blue and green may be added, if necessary). A light flux having a diameter of 5 mm was irradiated into the sample. The amount of light flux that had passed through the sample and also through a slit with the width of 5 mm in diameter located at a distance of 20 cm was detected with a photo detector. The maximum contrast ratio ($T_{100}/T_0$) was calculated from the maximum transmissivity ($T_{100}$) detected while a voltage is applied and the transmissivity ($T_0$) measured when no voltage is applied. The rising time ($\tau_r$) and the descending time ($\tau_d$) were measured with a digital storage oscilloscope (40 MHz, produced by Iwatsu Electric Co., Ltd.) by applying rectangular waves having a frequency of 120 Hz.

[1] Examples of the First Aspect of the Invention

[1-1] A pigment-bearing liquid crystal component was prepared by mixing 86 wt % of nematic liquid crystal "5CB" (produced by Merck Ltd., Japan) with 4.0 wt % of dichromatic melanotic pigment "Black-4" (produced by Mitsubishi Chemical Corporation), wherein 0.4% of the entire liquid crystal was chiral dopant prepared by mixing cholesteric liquid crystal "CM-33" (produced by Chisso Corporation) and liquid crystal "CS-2003" (produced by Chisso Corporation) showing the chiral smectic C phase with the weight ratio of 1:1. Subsequently, the mixture of hydroxyethylacrylate, phenoxyethylacrylate, polyethyleneglycoldiacrylate, polytetramethyleneglycol and "Karenz MOI-BM" with the weight ratio of 10:10:40:20:20 was added and mixed by 10 wt % as the polymer component. The mixture thus obtained was inserted into the space between two transparent conductive glass substrates coated with indium tin oxide and spaced apart with the gap of 10 μm defined by a spacer made of a polyimide film. Then, at a room temperature of 22° C., a parallel ray of ultra-violet light generated by a 100 W high-pressure mercury-vapor lamp was irradiated onto the mixture located at a distance of 20 cm from the light-irradiating lens for three minutes, to solidify the prepolymer. The light-controlling layer formed between the two substrates was 1 cm×1 cm in size. An observation of its texture with the polarization microscope showed that the liquid crystal phase formed the grains of the polydomain focalconic structure, each grain approximately a few micrometers in size with a certain amount of variation. Measurements of the electro-optical characteristics of the device at a room temperature of 20° C. showed that, with the driving voltage 6V, the maximum contrast ratio ($T_{100}/T_0$) was 300:1 or higher, $\tau_r$=5.2 ms and $\tau_d$=10.0 ms.

[1-2] A pigment-bearing liquid crystal component was prepared by mixing 80 wt % of nematic liquid crystal "5CB" (produced by Merck Ltd., Japan) with 10 wt % of dichromatic melanotic pigment "Black-1" (produced by Mitsubishi Chemical Corporation), wherein 0.4 wt % of the entire liquid crystal was chiral dopant prepared by mixing cholesteric liquid crystal "CM-33" (produced by Chisso Corporation) and liquid crystal "CS-2003" (produced by Chisso Corporation) showing the chiral smectic C phase with the weight ratio of 1:1. Subsequently, the mixture of hydroxyethylacrylate, phenoxyethylacrylate, polyethyleneglycoldiacrylate, polytetramethyleneglycol and "Karenz MOI-BM" with the weight ratio of 10:10:40:20:20 was added and mixed by 10 wt % as the polymer component. The mixture thus obtained was inserted into the space between two transparent conductive glass substrates coated with indium tin oxide and spaced apart with the gap of 10 μm defined by a spacer made of a polyimide film. Then, at a room temperature of 22° C., a parallel ray of ultra-violet light generated by a 100 W high-pressure mercury-vapor lamp was irradiated onto the mixture located at a distance of 20 cm from the light-irradiating lens for three minutes, to solidify the prepolymer. The light-controlling layer formed between the two substrates was 1 cm×1 cm in size. Measurements of the electro-optical characteristics of the device at a room temperature of 20° C. showed that, with the driving voltage 20V, the maximum contrast ratio ($T_{100}/T_0$) was 280:1 or higher, $\tau_r$=12.5 ms and $\tau_d$=18 ms.

[2] Examples of the Second Aspect of the Invention

Figure 5:
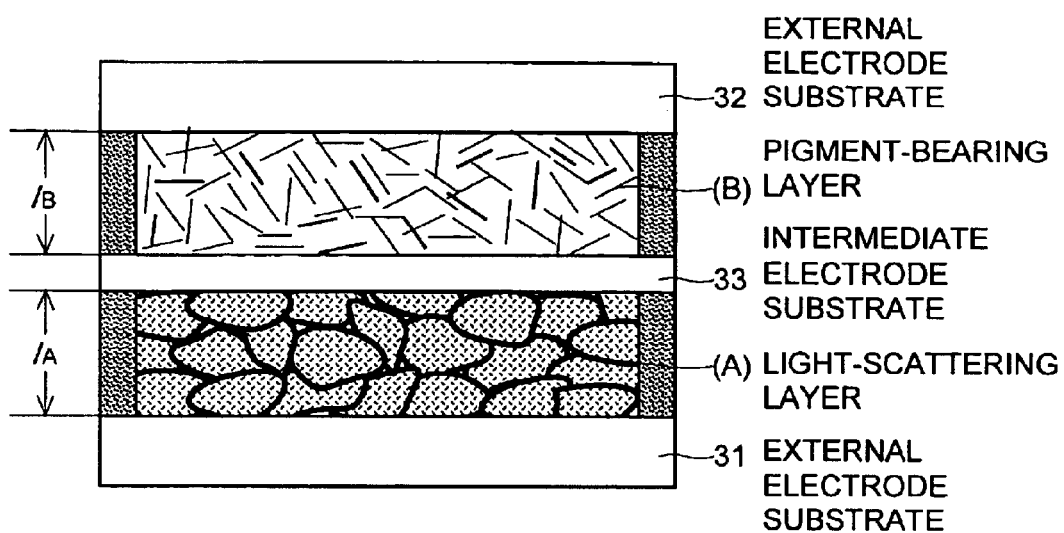
FIG. 5 is a drawing showing the construction of an optical shutter having two layers as a first example of the second aspect of the present invention, which has an intermediate electrode substrate.

[2-1] This example corresponds to the type that uses the intermediate electrode substrate (FIG. 5). As the liquid crystal component of the light-scattering layer (A), nematic liquid crystal "5CB" (produced by Merck Ltd., Japan) was used by 90 wt %, wherein 0.4% of the entire liquid crystal was chiral dopant prepared by mixing cholesteric liquid crystal "CM-33" (produced by Chisso Corporation) and liquid crystal "CS-2003" (produced by Chisso Corporation) showing the chiral smectic C phase with the weight ratio of 1:1. Subsequently, the mixture of hydroxyethylacrylate, phenoxyethylacrylate, polyethyleneglycoldiacrylate, polytetramethyleneglycol and Karenz MOI-BM (produced by Showa Denko K. K.) with the weight ratio of 10:10:40:10:30 was added and mixed by 10 wt % as the polymer component. The mixture thus obtained was inserted into the space between the external electrode substrate 31 and the intermediate electrode substrate 33 spaced apart with the gap of 5 μm defined by a spacer made of a polyimide film. The internal faces of the external electrode substrates 31 and 32 and both faces of the intermediate electrode substrate 33 were coated with transparent conductive layers of indium tin oxide. After the mixture of the liquid crystal and the polymer had been inserted, a parallel ray of ultra-violet light generated by a 100 W high-pressure mercury-vapor lamp was irradiated onto the mixture located at a distance of 20 cm from the light-irradiating lens at a room temperature of 22° C. for two minutes, to solidify the prepolymer (polymer component). Thus, the light-scattering layer (A) was obtained.

The material for the pigment-bearing layer (B) was prepared by mixing and stirring 96 wt % of nematic liquid crystal "5CB" (produced by Merck Ltd., Japan) and 4.0 wt % of dichromatic melanotic "Black-4" (produced by Mitsubishi Chemical Corporation), wherein 0.4% of the entire liquid crystal was cholesteric liquid crystal "CM-33" (produced by Chisso Corporation). The liquid crystal mixed with the dichromatic melanotic pigment was inserted into the space between the intermediate electrode substrate 33 and the other external electrode substrate 32 spaced apart with the gap of 5 μm defined by a spacer made of a polyimide film. Thus, the pigment-bearing layer (B) was obtained.

The two light-controlling layers (A) and (B) were 1 cm×1 cm in size. The light-scattering layer (A) and the pigment-bearing layer (B) were put together so that their working areas correspond to each other.

Measurements of the electro-optical characteristics of the device at a room temperature of 20° C. showed that, with the driving voltage 2.5V, the maximum contrast ratio ($T_{100}/T_0$) was 450:1 or higher, $\tau_r$=3.2 ms and $\tau_d$=5.1 ms.

[2-2] This example also corresponds to the type that uses the intermediate electrode substrate (FIG. 5). As the liquid crystal component of the light-scattering layer (A), nematic liquid crystal "5CB" (produced by Merck Ltd., Japan) was used by 90 wt %, wherein 0.4% of the entire liquid crystal was chiral dopant prepared by mixing cholesteric liquid crystal "CM-33" (produced by Chisso Corporation) and liquid crystal "CS-2003" (produced by Chisso Corporation) showing the chiral smectic C phase with the weight ratio of 1:1. Subsequently, the mixture of hydroxyethylacrylate, phenoxyethylacrylate, polyethyleneglycoldiacrylate, polytetramethyleneglycol and "Karenz MOI" (produced by Showa Denko K. K.) with the weight ratio of 10:10:50:10:20 was added and mixed by 10 wt % as the polymer component. The mixture thus obtained was inserted into the space between the external electrode substrate 31 and the intermediate electrode substrate 33 spaced apart with the gap of 5 μm defined by a spacer made of a polyimide film. Then, a parallel ray of ultra-violet light generated by a 100 W high-pressure mercury-vapor lamp was irradiated onto the mixture located at a distance of 20 cm from the light-irradiating lens at a room temperature of 22° C. for two minutes, to solidify the prepolymer. Thus, the light-scattering layer (A) was obtained.

The material for the pigment-bearing layer (B) was prepared by mixing and stirring 94 wt % of nematic liquid crystal "5CB" (produced by Merck Ltd., Japan) and 6.0 wt % of dichromatic melanotic "Black-4" (produced by Mitsubishi Chemical Corporation), wherein 0.4% of the entire liquid crystal was cholesteric liquid crystal "CM-33" (produced by Chisso Corporation). The liquid crystal mixed with the dichromatic melanotic pigment was inserted into the space between the intermediate electrode substrate 33 and the other external electrode substrate 32 spaced apart with the gap of 5 μm defined by a spacer made of a polyimide film. Thus, the pigment-bearing layer (B) was obtained.

The liquid crystal device thus constructed was 1 cm×1 cm in size. The light-scattering layer (A) and the pigment-bearing layer (B) were put together so that their working areas correspond to each other.

Measurements of the electro-optical characteristics of the device at a room temperature of 20° C. showed that, with the driving voltage 3.0V, the maximum contrast ratio ($T_{100}/T_0$) was 400:1 or higher, $\tau_r$=4.2 ms and $\tau_d$=6.4 ms.

Figure 6:
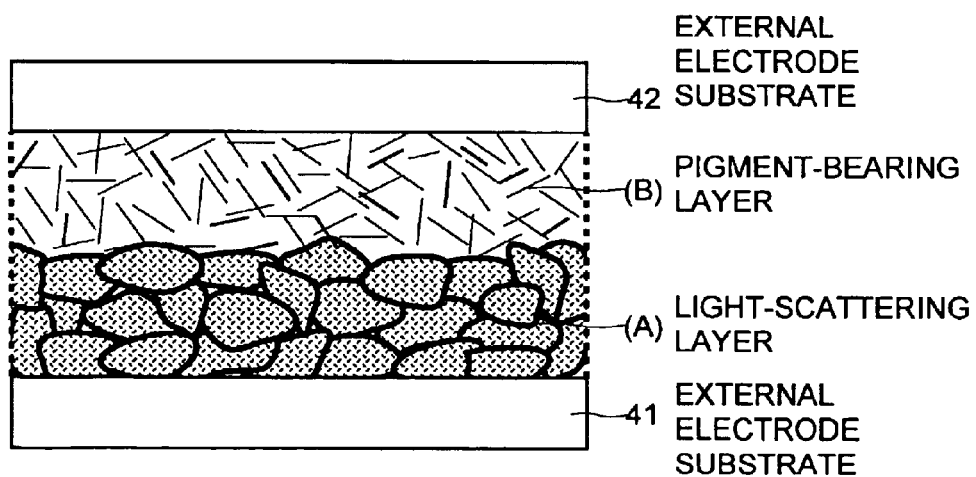
FIG. 6 is a drawing showing the construction of an optical shutter having two layers as a second example of the second aspect of the present invention, which requires no intermediate electrode substrate.

[2-3] This example corresponds to the type that does not use the intermediate electrode substrate (FIG. 6). As the liquid crystal component of the light-scattering layer (A), nematic liquid crystal "5CB" (produced by Merck Ltd., Japan) was prepared by 90 wt %, wherein 0.4% of the entire liquid crystal was chiral dopant prepared by mixing cholesteric liquid crystal "CM-33" (produced by Chisso Corporation) and liquid crystal "CS-2003" (produced by Chisso Corporation) showing the chiral smectic C phase with the weight ratio of 1:1. Subsequently, the mixture of hydroxyethylacrylate, phenoxyethylacrylate, polyethyleneglycoldiacrylate, polytetramethyleneglycol and "Karenz MOI-BM" (produced by Showa Denko K. K.) with the weight ratio of 10:10:40:10:30 was added and mixed by 10 wt % as the polymer component. The mixture was deposited on the top (conductive side) of a transparent conductive glass substrate 41 (external electrode substrate) coated with indium tin oxide by the spin coat method (thickness: 7 μm). Immediately after that, a parallel ray of ultra-violet light generated by a 100 W high-pressure mercury-vapor lamp was irradiated onto the mixture under the $N_2$ gas atmosphere at a room temperature of 22° C. for one minute, to solidify the prepolymer. Thus, the light-scattering layer (PCW-LC) (A) was obtained (thickness: 7 μm). Then, the gap was set at 10 μm with a spacer made of a polyimide film, and another transparent conductive glass substrate 42 (external electrode substrate) coated with indium tin oxide was fixed to it with the conductive side directed inwards (or downwards in FIG. 6). Thus, a cell having a 3 μm gap was obtained. Into this gap, liquid crystal bearing dichromatic melanotic pigment was inserted to create the pigment-bearing layer (B). Thus, a two-layer type liquid crystal display device in which the light-scattering layer (A) and the pigment-bearing layer (B) were in direct contact was obtained.

The liquid crystal bearing dichromatic melanotic pigment was prepared by stirring and mixing 96 wt % of nematic liquid crystal "5CB" (produced by Merck Ltd., Japan) and 4.0 wt % of dichromatic melanotic pigment "Black-4" (produced by Mitsubishi Chemical Corporation), wherein 0.4% of the entire liquid crystal was cholesteric liquid crystal "CM-33" (produced by Chisso Corporation).

The liquid crystal display device constructed as described above was 1 cm×1 cm in size. The light-scattering layer (PCW-LC) (A) and the pigment-bearing layer (B) were put together so that their working areas correspond to each other.

Measurements of the electro-optical characteristics of the device at a room temperature of 20° C. showed that, with a driving voltage of 6V, the maximum contrast ratio ($T_{100}/T_0$) was 450:1 or higher, $\tau_r$=5.2 ms and $\tau_d$=10.1 ms.

[2-4] This example also corresponds to the type that does not use the intermediate electrode substrate (FIG. 6). As the liquid crystal component of the light-scattering layer (A), nematic liquid crystal "5CB" (produced by Merck Ltd., Japan) was prepared by 90 wt %, wherein 0.4% of the entire liquid crystal was chiral dopant prepared by mixing the cholesteric liquid crystal "CM-33" (produced by Chisso Corporation) and the liquid crystal "CS-2003" (produced by Chisso Corporation) showing the chiral smectic C phase with the weight ratio of 1:1. Subsequently, the mixture of hydroxyethylacrylate, phenoxyethylacrylate, polyethyleneglycoldiacrylate, polytetramethyleneglycol and "Karenz MOI-BM" (produced by Showa Denko K. K.) with the weight ratio of 10:10:50:10:20 was added and mixed by 10 wt % as the polymer component. The mixture was deposited on the top (conductive side) of a transparent conductive glass substrate 41, which is an external electrode substrate coated with indium tin oxide, by the spin coat method (thickness: 7 μm). Immediately after that, a parallel ray of ultra-violet light generated by a 100 W high-pressure mercury-vapor lamp was irradiated onto the mixture under the $N_2$ gas atmosphere at a room temperature of 22° C. for one minute, to solidify the prepolymer. Thus, the light-scattering layer (PCW-LC) (A) was obtained (thickness. 7 μm). Then, the gap was set at 10 μm with a spacer made of a polyimide film, and another transparent conductive glass substrate 42, which is also an external electrode substrate coated with indium tin oxide, was fixed to it with the conductive side directed inwards. Thus, a cell having a 3 μm gap was obtained. Into this gap, liquid crystal bearing dichromatic melanotic pigment was inserted to create the pigment-bearing layer (B). Thus, a two-layer type liquid crystal display device in which the light-scattering layer (A) and the pigment-bearing layer (B) were in direct contact was obtained.

The liquid crystal bearing dichromatic melanotic pigment was prepared by stirring and mixing 92 wt % of nematic liquid crystal "5CB" (produced by Merck Ltd., Japan) and 8.0 wt % of dichromatic melanotic pigment "Black-4" (produced by Mitsubishi Chemical Corporation), wherein 0.4% of the entire liquid crystal was cholesteric liquid crystal "CM-33" (produced by Chisso Corporation).

The liquid crystal display device constructed as described above was 1 cm×1 cm in size. The light-scattering layer (PCW-LC) (A) and the pigment-bearing layer (B) were put together so that their working areas correspond to each other.

Measurements of the electro-optical characteristics of the device at a room temperature of 20° C. showed that, with a driving voltage of 9V, the maximum contrast ratio ($T_{100}/T_0$) was 350:1 or higher, $\tau_r$=10.2 ms and $\tau_d$=16.4 ms.

What is claimed is:

1. A liquid crystal display device including two conductive substrates, wherein at least one of which is transparent, and a light-controlling layer inserted between the two substrates, wherein:
   a) the light-controlling layer is composed of an accumulation of small packets each composed of chiral nematic liquid crystal packed with a thin film made of transparent polymeric solid;
   b) the chiral nematic liquid crystal contains:
      b1) 0.05 to 5% of chiral dopant by weight of the liquid crystal; and
      b2) 0.001 to 20% of dichromatic melanotic pigment by weight of the liquid crystal, and
   c) the chiral dopant is a mixture of
      c1) cholesteric liquid crystal; and
      c2) ferroelectric liquid crystal showing the chiral smectic C phase.

2. The liquid crystal display device according to claim 1, wherein the percentage of the transparent polymeric solid in the light-controlling layer is 1 to 50 wt %.

3. The liquid crystal display device according to claim 1, wherein the percentage of the transparent polymeric solid in the light-controlling layer is 8 to 20 wt %, and the percentage of the dichromatic melanotic pigment in the chiral nematic liquid crystal is 0.1 to 15 wt %.

4. A method for producing a liquid crystal display device, characterized by the following steps:
   a) chiral dopant is prepared by mixing cholesteric liquid crystal and ferroelectric liquid crystal showing the chiral smectic C phase;
   b) 0.05 to 5 wt % of the chiral dopant and 0.001 to 20 wt % of dichromatic melanotic pigment are mixed into nematic liquid crystal;
   c) a mixture of 1 to 50 wt % of prepolymer to be polymerized into transparent polymeric solid and the chiral nematic liquid crystal is inserted into the space between two conductive substrates, wherein at least one of which is transparent; and
   d) ultra-violet light or neighboring short-wavelength light is irradiated onto the mixture to form an accumulation of small packets each composed of the liquid crystal packed with a thin film of the transparent polymeric solid.

5. A liquid crystal display device, comprising:
   a) two external electrode substrates, wherein at least one of which is transparent; and
   b) light-controlling layers including a pigment-bearing layer and a light-scattering layer inserted between the two substrates, wherein:
   c) the pigment-bearing layer is composed of nematic liquid crystal, chiral nematic liquid crystal or cholesteric liquid crystal into which dichromatic melanotic pigment is mixed; and
   d) the light-scattering layer is composed of an accumulation of small packets each composed of chiral nematic liquid crystal packed with a thin film of transparent polymeric solid, the chiral nematic liquid crystal contains 0.05 to 5 wt % of chiral dopant, and the chiral dopant is a mixture of cholesteric liquid crystal and ferroelectric liquid crystal showing the chiral sinectic C phase.

6. A liquid crystal display device, comprising:
   a) two external electrode substrates, wherein at least one of which is transparent;

b) an intermediate electrode substrate inserted between the two substrates with a gap from each of the two substrates; and c) light-controlling layers including a pigment-bearing layer and a light-scattering layer between the two substrates, wherein:

d) the pigment-bearing layer is composed of nematic liquid crystal, chiral nematic liquid crystal or cholesteric liquid crystal into which dichromatic melanotic pigment is mixed; and e) the light-scattering layer is composed of an accumulation of small packets each composed of chiral nematic liquid crystal packed with a thin film of transparent polymeric solid, the chiral nematic liquid crystal contains 0.05 to 5 wt % chiral dopant, and the chiral dopant is the mixture of cholesteric liquid crystal and ferroelectric liquid crystal showing the chiral smectic C phase.

7. A method for producing a liquid crystal display device, characterized by the following steps:

a) chiral dopant is prepared by mixing cholesteric liquid crystal and ferroelectric liquid crystal showing chiral smectic C phase;

b) chiral nematic liquid crystal is prepared by mixing 0.05 to 5 wt % of the chiral dopant into nematic liquid crystal;

c) a mixture of 1 to 50 wt % of prepolymer to be polymerized into transparent polymeric solid and the chiral nematic liquid crystal is deposited onto an external electrode substrate, followed by ultra-violet light or neighboring short-wavelength light which is irradiated onto the mixture to form an accumulation of small packets each composed of the liquid crystal packed with a thin film of the transparent polymeric solid; and d) a pigment-bearing layer is formed on the light-scattering layer, where the pigment-bearing layer is composed of nematic liquid crystal, chiral nematic liquid crystal or cholesteric liquid crystal into which diebromatic melanotic pigment is mixed.

8. The liquid crystal display device according to claim 2, wherein the percentage of the transparent polymeric solid in the light-controlling layer is 8 to 20 wt %, and the percentage of the dichromatic melanotic pigment in the chiral nematic liquid crystal is 0.1 to 15 wt %.

* * * * *